United States Patent [19]

Doi et al.

[11]  4,335,193

[45]  Jun. 15, 1982

[54] MICROPOROUS FILM, PARTICULARLY BATTERY SEPARATOR, AND METHOD OF MAKING

[75] Inventors: Yoshinao Doi, Kanagawa; Shigeo Kaneko, Tokyo; Takeo Hanamura, Kanagawa; Osamu Fujii, Tokyo; Katsumi Yoshitake; Tetsuhiko Hirata, both of Kanagawa; Yasuhiro Tanabe, Shizuoka, all of Japan

[73] Assignee: Asahi Kasei Kogyo Kabushiki Kaisha, Osaka, Japan

[21] Appl. No.: 16,176

[22] Filed: Feb. 28, 1979

Related U.S. Application Data

[63] Continuation of Ser. No. 694,173, Jun. 9, 1976, abandoned.

[30]  Foreign Application Priority Data

Jun. 18, 1975 [JP]  Japan ................................. 50/73031

[51] Int. Cl.$^3$ ........................................... H01M 2/16
[52] U.S. Cl. ................................. 429/251; 210/500.2; 264/49; 429/254
[58] Field of Search ............ 521/61, 143; 210/500 M; 264/210.8, 49; 526/352; 429/254, 251

[56]  References Cited

U.S. PATENT DOCUMENTS 3,536,796 10/1970 Rock ................................... 521/61 X
3,956,020  5/1976 Weininger et al. ............... 521/61 X
3,962,205  6/1976 Ward et al. .................. 264/210.8 X
4,190,707  2/1980 Doi et al. .......................... 429/254

Primary Examiner—Frank A. Spear, Jr.
Attorney, Agent, or Firm—Armstrong, Nikaido, Marmelstein & Kubovcik

[57]  ABSTRACT

This invention is directed to a microporous film comprising a 40 to 90 volume percent polyolefin having a number average molecular weight of 15,000 or more and a weight average molecular weight of less than 300,000 and a 10 to 60 volume percent inorganic filler and having a void space rate or porosity of 30 to 75 volume percent based on the volume of the film. The microporous film of such specific composition and structure has a desired wettability and a much reduced electrical resistance. Said resistance being as low as 0.0006 Ωdm$^2$/sheet. Said film has sufficient flexibility and mechanical strength to make it useful in wide variety of applications, especially as separators in batteries or electrolytical apparatuses etc. Such microporous material is prepared by: (a) blending a specified polyolefin, an inorganic filler and an organic liquid in amounts of 10 to 60 volume percent, 6 to 35 volume percent and 30 to 75 volume percent, respectively, based on the total volume of the blend, the amount of the polyolefin being $\frac{2}{3}$ to 9 times the amount of the inorganic filler; (b) molding the blend to form a film; and (c) extracting said organic liquid from the molded film.

29 Claims, 4 Drawing Figures (a)

(b)

(c)

MICROPOROUS FILM, PARTICULARLY BATTERY SEPARATOR, AND METHOD OF MAKING

This is a continuation of application Ser. No. 694,173, filed June 9, 1976, now abandoned.

BACKGROUND OF THE INVENTION

1. Field of the Invention

This invention relates to a microporous film, and more particularly to a microporous film comprising a matrix composed of a polyolefin and an inorganic filler and void spaces formed therein and having overall a microporous structure.

2. Description of the Prior Art

There have heretofore been proposed:

(1) a porous film prepared by the method kneading and molding a polyvinyl chloride resin, a solvent for the resin, a plasticizer and silica into a film, and then subjecting the molded film to drying process (See, for example Japanese Patent Application Publication No. 2922/1962);

(2) a porous film prepared by sintering a mixture of powder polyvinyl chloride resin and finely divided silica (See, for example Japanese Patent Application Publication No. 3092/1960); and;

(3) a porous film prepared by molding a mixture of a polyolefin having a standard load melt index of 0 and a viscosity average molecular weight of 300,000 or more, silica and a plasticizer into a film and extracting the plasticizer from the molded film. (See, for example U.S. Pat. No. 3,351,495).

In case a porous film is employed as a separator in a lead accumulator, the film is required to have a small electrical resistance in the electrolyte. For a high-performance separator, the film should have an electrical resistance lower than 0.0006 $\Omega dm^2$/sheet. To meet this requirement, the film should have high void space rate or porosity to enjoy an electrical resistance as low as 0.0003 $\Omega dm^2$/0.1 mm (in thickness) or less and a thickness of about 0.2 mm. In case the electrical resistance is higher than 0.0003 $\Omega dm^2$/0.1 mm, the film should be formed extremely thin, to wit, less than 0.2 mm thick.

In this connection, it is to be noted that the conventional porous films (1) and (2) made of a polyvinyl chloride resin as mentioned above can be imparted with an electrical resistance as low as 0.0003 $\Omega dm^2$/0.1 mm, but they have such defects as being brittle and lacking flexibility so that it is extremely difficult to form them into a film having a thickness of less than 0.4 mm which is suitable for practical use. On the other hand, the conventionally proposed porous film made of an ordinary polyolefin and a vast amount of inorganic filler fails to have flexibility and is too brittle to be practically utilizable. The method mentioned above with reference to said film (3) has been proposed to solve the problem of brittleness and lack of flexibility. Said method is not satisfactory because the super-high molecular weight polyolefin employed (that having a standard load melt index of zero and a viscosity average molecular weight of 300,000 (which is nearly equal to a weight average molecular weight)) has low flow characteristics. Further, said film (3) has an electrical resistance higher than 0.0003 $\Omega dm^2$/0.1 mm. Thus, it is difficult to produce a high-performance separator having an electrical resistance as low as 0.0006 $\Omega dm^2$/sheet or less from the conventional films.

SUMMARY OF THE INVENTION

Accordingly, one and principal object of the present invention is to provide a microporous film having a high mechanical strength and great flexibility and, in addition, wetting characteristics, showing much reduced electrical resistance in an electrolyte.

The inventors of the present application have made an intensive and extensive study with a view to obtaining a microporous film of high void space rate or porosity while keeping sufficient mechanical strength and flexibility, and surprisingly found that with use of a polyolefin having a molecular weight of a specified range there can be effectively produced, with a good molding processability a microporous film having excellent properties.

In one aspect of the present invention, there is provided a microporous film which comprises 40 to 90 volume percent of a polyolefin having a number average molecular weight of 15,000 or more and a weight average molecular weight of less than 300,000 and 10 to 60 volume percent of an inorganic filler; and which has a void space rate of 30 to 75 volume percent based on the volume of the film. The microporous film of the present invention has a mechanical strength and flexibility sufficient for various uses, particularly for an electrochemical or electrolytical separator or battery separator. With this microporous thin film, the electrical resistance of a separator is reduced to 1/10 of the resistance of a separator made of conventional film such as polyvinyl chloride-sintered film, polyvinyl chloride-extracted film, etc.

The foregoing and other objects, features and advantages of the invention will be better understood from the following detailed description and appended claims taken in connection with the accompanying drawings in which:

BRIEF DESCRIPTION OF THE DRAWINGS

FIG. 1 (b) is an enlarged diagrammatical view of a portion x-y-z as shown in FIG. 1 (a);

FIG. 1 (c) is an enlarged diagrammatical view of a portion S as shown in FIG. 1 (b), illustrating the web structure defining a network of voids;

DESCRIPTION OF THE PREFERRED EMBODIMENTS

Figure 1:
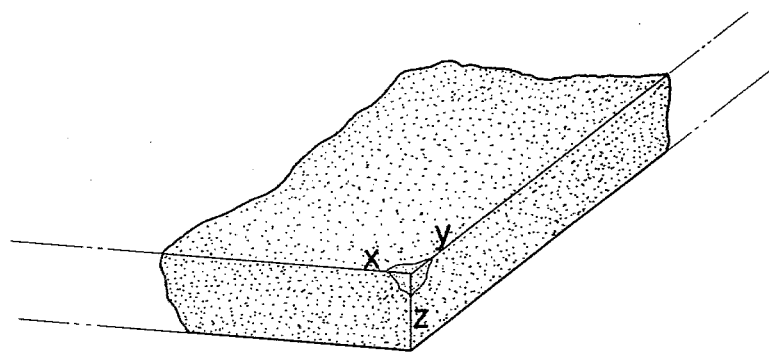
FIG. 1 (a) is an enlarged diagrammatical view of a microporous film of the present invention, shown with the inorganic filler extracted.
Figure 1:
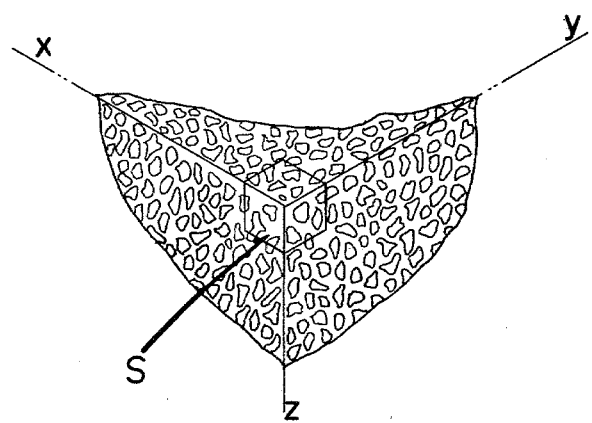
Figure 1:
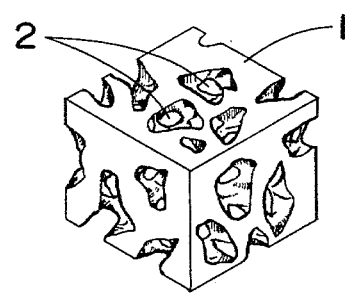

The most important characteristic feature of the present invention is in the polyolefin employed. According to the present invention, there should be employed a polyolefin having a number average molecular weight of 15,000 or more, preferably, 17,000 to 50,000 and a weight average molecular weight of less than 300,000, preferably ranging from 85,000 to 250,000. There may be employed a polyolefin having a standard load melt index of 0.01 or more, preferably 0.03 to 1. With use of such specific polyolefin, it is possible to form a flexible thin film having a thickness ranging from 0.05 to 1 mm. In contrast, when a polyolefin having a number average molecular weight of less than 15,000 is employed, the resulting porous film obtained exhibits poor stretchability and is brittle. Whereas, when a polyolefin having a weight average molecular weight of 300,000 or more is employed, problems relating to: (a) moldability result because of the poor flow characteristics of the polymer in the molten state; and (b) electrical resistance of the film produced therefrom result because the void space rate or porosity is low.

The term "polyolefin" used herein is intended to include homopolymers and copolymers of olefins and include, for example, polyethylene, polypropylene, polybutene, ethylene-propylene copolymer, ethylene-butene copolymer, ethylene-propylene-butene tercopolymer and mixtures thereof so long as they have a number average molecular weight of 15,000 or more and a weight average molecular weight of less than 300,000. Of these resins, polyethylene or a copolymer of ethylene as a main component with other olefin is most preferable.

The inorganic filler employed serves to impart wetting characteristics to the film and the filler is preferably finely divided particles or porous particles having an average particle diameter ranging from 0.005 to 0.5$\mu$ and a specific surface area of 50 to 500, preferably 150 to 400 m$^2$/g. As specific examples of the inorganic fillers, there can be mentioned silica, calcium silicate, aluminum silicate, aluminum oxide, calcium carbonate, magnesium carbonate, kaolin clay, pulverized talc, titanium oxide, diatomaceous earth, carbon black, etc. Two or more kinds of fillers may be employed in combination. In this case, one of the fillers should have a hydrophilic property. Silica is the preferred filler for an electrolytic separator in a lead accumulator which uses an acid electrolyte.

In the microporous film of the present invention the ratio of polyolefin to inorganic filler is 40 to 90 volume percent to 10 to 60 volume percent. For use as a separator, said ratio is preferably 50 to 80 volume percent (polyolefin) to 20 to 50 volume percent (filler) and more preferably 60 to 70 volume percent to 30 to 40 volume percent. In case the amount of the filler employed exceeds 60 volume percent, the film obtained has a poor flexibility and is not practically employable even when a polyolefin having a number average molecular weight of 15,000 or more is employed. On the other hand, if the amount of the filler employed is less than 10 volume percent, the strength of the film obtained increases but the wetting characteristics thereof is so reduced that the film cannot be utilized as a separator.

Referring to FIG. 1 there is shown enlarged diagrammatic views of a microporous film, with the silica extracted, of the present invention. As seen from FIG. 1, especially from FIG. 1 (c), the microporous film has such a structure that the polyolefin constitutes a web structure 1 and voids 2 defined by the polyolefin web structure are formed in a network. The voids open at the surface of the film, and the average diameter of the opening portions of the voids is in the range of 0.05 to 0.5$\mu$. The network of voids contains the filler (i.e., the filler is not extracted), leaving a space forming a path communicating from one surface of the film to the opposite surface of said film.

The term "void" used herein has a meaning as apparent from the above description and more illustratively it means a void portion defined by the polyolefin web structure but having the filler contained therein. The term "void space" used herein has a meaning as apparent from the above description and more illustratively it means a space left in the void and formed by cooperation between the particles of filler contained therein and cooperation between the wall of the void and the particles of filler contained therein. The term "void space rate" used herein means a volume rate of void spaces formed in the overall structure of the microporous film.

The actual average diameter of the void in the state where the filler is attachedly disposed, namely the average diameter of the opening portion of the void space, is as small as 0.01 to 0.1$\mu$. The thus formed film of the present invention has a void space rate of 30 to 75 volume percent based on the volume of the film. In case the void space rate is less than 30 volume percent, the electrical resistance increases and the film obtained can not be effectively employed as a separator. Whereas, in case the void space rate exceeds 75 volume percent, the strength of the film obtained is so reduced that the film can not be practically utilized. To meet the requirements both of strength and electrical resistance, the void space rate is preferably within the range of 45 to 65 volume percent. Further, in order that the microporous material may have a desired electrical resistance and a void space of a size suitable for preventing the passage of solid materials and permitting ions to pass through while maintaining a mechanical strength, the average diameter of the void is in the range of 0.05 to 0.5$\mu$ and more preferably in the range of 0.08 to 0.3$\mu$.

The microporous film of the present invention has a thickness of 0.05 to 1 mm. The film thickness of a separator is preferably within the range of 0.10 to 0.30 mm because of the good moldability of the polymer and the strength of the resulting film.

Thus, the film of the present invention which has a high porosity with fine pores formed in a network structure, sufficient mechanical strength and excellent flexibility is further imparted with an unexpected low electrical resistance (as low as 0.0006 $\Omega$dm$^2$/sheet) and can be employed with great advantage as a separator of enhancing performance.

Figure 3:
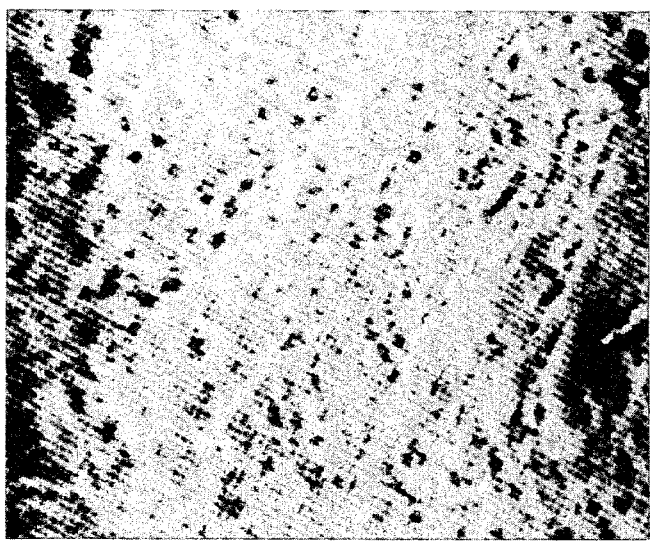
FIG. 3 is a similar scanning electron photomicrographic (x 10,000) plan view of the film obtained in Comparative Example 5, with the silica extracted.
Figure 2:
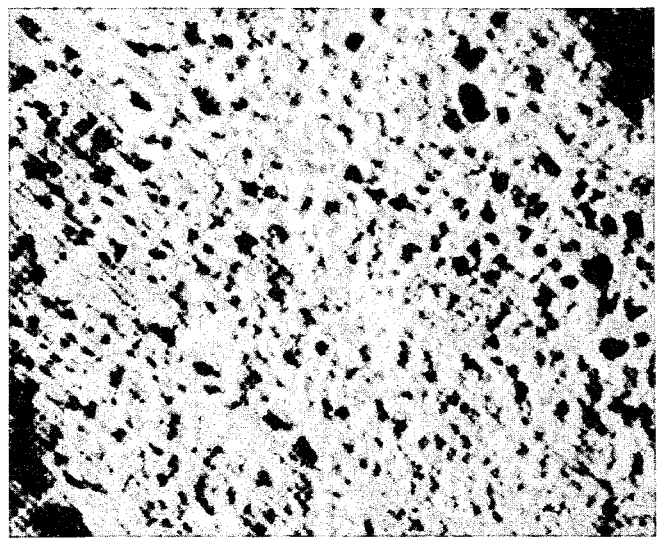
FIG. 2 is a scanning electron photomicrographic (x 10,000) plan view of the microporous film obtained in Example 3, with the silica extracted.
Figure 4:
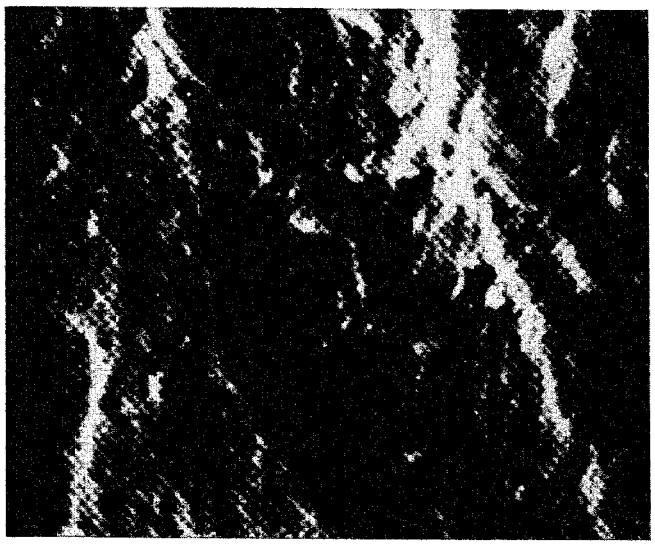
FIG. 4 is a similar scanning electron photomicrographic (x 10,000) plan view of the film obtained in Comparative Example 7, with the silica extracted.

Referring to FIG. 2, there is shown a scanning electron photomicrographic plan view of the present microporous film, in comparison with those of conventional porous films as shown in FIGS. 3 and 4. As is seen from these Figures, the present microporous film has definite pores of a suitable size numbering as many as 4 to 6 $\times$ 10$^8$/cm$^2$, leading to a desired electrical resistance as low as 0.0006 $\Omega$dm$^2$/sheet while maintaining high mechanical strength, as opposed to conventional porous films in which there are formed pores of too small size to distinguish, which exerts an unfavourable influence on the electrical resistance by increasing said resistance.

Because of the excellent properties as mentioned above, the microporous film of this invention has a wide variety of uses, for example, as battery separators, filters, liquid retainers, wrapping materials, synthetic paper, etc. In view of its extremely low electrical resistance in an electrolyte, the microporous film of the present invention is applicable with great advantage as battery separators and as separators in various electrochemical or electrolytical apparatuses.

The microporous film of the present invention formed of a polyolefin and an inorganic filler is produced, for example by a process as given below but this invention is not limited thereto.

Accordingly, in another aspect of the present invention there is provided a process for preparing a microporous film which comprises: (a) blending a polyolefin having a number average molecular weight of 15,000 or more and a weight average molecular weight of less than 300,000, an inorganic filler and an organic liquid in amounts of 10 to 60 volume percent, 6 to 35 volume percent and 30 to 75 volume percent, respectively, based on the whole volume of the polyolefin-filler-liquid composition, the amount of the polyolefin being $\frac{2}{3}$ to 9 multiple of the amount of the inorganic filler; (b) subjecting the resulting blend to molding to form a film; and (c) extracting said organic liquid from said film.

Based on the total volume of polyolefin, inorganic filler and organic liquid, 6 to 35 volume percent inorganic filler and 30 to 75 volume percent organic liquid are blended together using an ordinary mixer such as a Henschel mixer or V-shaped tumbler to adsorb the organic liquid onto the surface of the filler particles. The conditions of the above blending vary slightly according to the type of mixer and rotation speed thereof, but usually the blending is accomplished by mixing at room temperature for about one minute. A polyolefin is then mixed with the above obtained blend in an amount of 10 to 60 percent by volume but $\frac{2}{3}$ to 9 multiple by weight based on the inorganic filler. The above-mentioned blending of three components is preferably effected in two stages, but a one-stage blending operation can be used. When two stage blending is employed, good handling characteristics and excellent dispersion of the component can be attained. Whilst, when the one-stage blending is employed, the polyolfin tends to be wetted with the organic liquid so that good dispersion of the components can not be attained. In such case, however, the dispersion of the three components can be attained by adjusting rotation speed of the mixer, blending time, etc.

The resulting polyolefin-filler-liquid blend is kneaded by a kneading machine such as an extruder, a Banbury mixer, a mixing twin roll, a kneader or the like. The thus kneaded material is subjected to molding to form it into a film having a thickness of 0.05 to 1 mm. Typical examples of the molding are extrusion molding employing a T-die or inflation method, calender molding, compression molding, injection molding, etc. The T-die extrusion molding is especially preferred when forming a film as thin as 0.05 to 1 mm. The molding may be effected under molding conditions as ordinarily employed in molding polyolefins in that the molding is effected at a temperature higher than the melting point of the polyolefin employed and below the boiling point of the organic liquid employed.

The kneading step described above is optional in the method of the present invention. Particularly, in extrusion molding in which the kneading is also conducted simultaneously, a separate step for kneading is not necessary. But when the kneading step is employed, the bulk density of the blend can be appropriately controlled and, at the same time, good dispersion of the components can be attained. This results in improved handling characteristics and reduction of pin holes of the product film. Such reduction of pin holes is particularly important for battery separators and separators of various electrolytical apparatus.

The organic liquid is extracted from the molded film at a temperature below the melting point of the polyolefin by a solvent for the organic liquid employed, to form a final microporous film made of 40 to 90 volume percent polyolefin and 10 to 60 volume percent inorganic filler and having a void space rate of 30 to 75 volume percent based upon the film volume.

The organic liquid employable in the present invention: (a) is preferably kept in a liquid state at the time of molding; (b) is readily soluble in general organic solvents or water; and (c) is easily extractible from the molded film. The organic liquid is selected from those organic liquids having a solubility parameter (hereinafter referred to as "SP") of 8.4 to 9.9, preferably from 8.6 to 9.4. An organic liquid having an SP of more than 9.9, when used in the method of the present invention, forms coarse pores or voids at least as large 0.5μ in average diameter and the resultant film has a poor elongation and is brittle. On the other hand, with an organic liquid having an SP of less than 8.4, the breaking strength and elongation are improved but the electrical resistance is also increased.

It should be noted that, according to the present invention, using of an organic solvent having an SP of 8.4 to 9.9 as well as a polyolefin having a number average molecular weight of 15,000 or more and a weight average molecular weight of less than 300,000, there is obtained a microporous film of a specific construction in which the polyolefin constitutes a web structure defining a network of voids in which the filler is attachedly contained, leaving a space to form a path communicating from one surface of the film to the opposite surface thereof, said voids having average void diameters ranging from 0.05 to 0.5μ.

Representative examples of the organic liquid having an SP ranging from 8.4 to 9.9 are phthalic acid esters such as diethyl phthalate (DEP), dibutyl phthalate (DBP), and dioctyl phthalate (DOP); fatty acid esters such as dioctyl sebacate (DOS) and dioctyl adipate (DOA); maleic acid esters such as dibutyl maleate; trimellitic acid esters such as trioctyl trimellitate (TOTM); phosphoric acid esters such as tributyl phosphate (TBP), octyl diphenyl phosphate; other esters; glycols such as polyethylene glycol; and the like.

Solvents employable for extracting the organic liquid from the molded film are selected from those capable of dissolving the organic liquid but not dissolving the polyolefin used.

Representative examples of such solvent include alcohols such as methanol, ethanol and iso-propanol; ketones such as acetone; chlorine-substituted hydrocarbons such as trichloroethylene and 1,1,1-trichloroethane; and the like. The extraction of the organic liquid from the molded film may be accomplished by employing various methods ordinarily employed in the art, for example a batch type dipping method, a counter-flow method and the like (U.S. Pat. No. 3,351,495 may be referred to for further details).

Since the average diameter of the void of the present porous film is in an appropriate range, i.e. 0.05 to 0.5μ and the SP value of the organic liquid employed in the present invention is 8.4-9.9, far removed from the SP value of polyolefin of 7.9 to 8.0, almost all of the organic liquid, e.g., 98% or more thereof is easily extracted at room temperature in a few minutes.

According to the present invention, it is not necessary to remove by extraction all of the organic liquid used. Hence, the organic liquid may remain in the product film in such an amount that the properties of the film are not impaired. However, if the extraction is not effected to an extent, the porosity or void space rate is lowered, which is of course undesirable in film intended for use as a separator. The acceptable residual rate of the organic liquid is generally 5% or less preferably 2% or less.

After extraction of the organic liquid, the film is subjected to drying. Drying may be accomplished at room temperature under atomospheric or reduced pressure or with heated air or by contact heating-drying.

Though the microporous film of the present invention is substantially formed of a polyolefin and an inorganic filler and has fine pores, an antioxidant, lubricant or plasticizer may be added in such amounts that the properties of the film are not adversely effected.

The present invention will now be described in detail by reference to the following Examples that by no means limit the scope of the present invention.

The properties shown in said Examples were measured in the following method.

Weight average molecular weight ($\overline{M}_w$),
Number average molecular weight ($\overline{M}_n$),
GPC measuring apparatus—Model 200 manufactured by Waters Assoc. Co.
Column—G 7000S—G 3000S manufactured by Toyo Soda Kogyo K.K.
Solvent—trichlorobenzene
Measuring temperature—135° C.
Viscosity average molecular weight ($\overline{M}_v$):
($\overline{M}_w \approx \overline{M}_v$)
Measured by using Decalin at a temperature of 135° C.
$[\eta] = 6.20 \times 10^{-4} M_v^{0.70}$ (Formula of Chiang)
The average molecular weight of polyethylene having a SLMI of 0 was measured according to this method and then calculated.

Composition ratio (volume percent):
Calculated from the value obtained by dividing the amount of the respective materials charged by their respective true specific gravities.

Porosity (Void space rate) (%):
Void space volume/film volume × 100
(Void space volume = Wet volume — oven dry weight)

Average void diameter (μ):
Weighted average calculated from averages of long and short diameters of the opening of the voids measured from scanning electron photomicrograph of the porous film where both the organic liquid and the inorganic filler are extracted.

Specific surface area (m²/g):
Measured according to BET adsorption method

Average void space diameter (μ):
Calculated from specific surface area measured by BET absorption method $$d = \frac{2V}{S} \quad \begin{array}{l} \text{d: diameter } (\mu) \\ \text{S: specific surface area } (m^2/g) \\ \text{V: void space voluce } (ml/g) \end{array}$$

Breaking strength (kg/cm²) and Breaking elongation (%):
Measured according to ASTM D-882 except that there is employed an initial strain rate=2.0 mm/mm min. with Instron type tension tester Electrical resistance (Ωdm²/sheet):
Measured by using dilute sulfuric acid having a specific gravity of 1,200 according to JIS-C-2318

Folding endurance (times):
Measured by MIT type folding tester (0.3 kg tension/15 mm width) according to ASTM D-2176

Melt index (MI):
Measured accordint to ASTM-1238-65T (Condition E)

Solubility parameter (SP):
Calculated by the formula dΣG/M wherein G: molar atraction constant
d: specific gravity
m: molecular weight Permeability (sec/100 ml)
Measured according to ASTM D-726, Method A

EXAMPLE 1

15 vol.% of finely divided silica [Aerosil #200(trade name): Specific surface area 175 m²/g, average diameter of particles 16 mμ] and 61 vol.% of dioctyl phthalate (DOP SP=8.9) were mixed in the Henschel mixer and further mixed with 24—vol.% of polyethylene [Suntec A-360(trade name): $\overline{M}_w = 85,000$, $\overline{M}_n = 21,000$ and SLMI=1] in this mixer. By a twin extruder having a diameter of 30 mm, the blend was kneaded, extruded and pelletized. These pellets were extruded to form a film using an extruder having a T-die of 420 mm diameter attached thereto, at an extruding rate of 12 kg/hr, an extruding speed of 2 m/min and a resin pressure of 70 kg/cm². The extruded film was immersed in 1,1,1-trichloroethane (chlorocene) for 5 minutes to extract DOP. The porous film thus obtained had a thickness of 0.13 mm and a void space rate of 58%. The substrate of the porous film consisted of 61.5 vol.% of polyethylene, 38.3 vol.% of finely divided silica and 0.2 vol.% of DOP. The porous film had a breaking strength of 29 kg/cm², a breaking elongation of 106% and a folding endurance of 2400 runs, showing an excellent elongation and flexibility. The web structure of the porous film composed of the resin was examined using an electron microscope and found to contain voids having an average diameter of 0.10μ. The porous film loaded with the finely divided silica had a void space of average diameter of 0.02μ which was measured by BET method and a maximum diameter of 0.09μ. This film had an electrical resistance as low as 0.00022 Ωdm²/sheet. When water was dropped on the film, it (the water) was absorbed immediately.

EXAMPLE 2

The procedures of Example 1 were repeated except that 13 vol.% of finely divided silica, 34 vol.% of polyethylene and 53 vol.% of octyl trimellitate were used. The porous film obtained had 72.2 vol.% of resin, 27.5 vol.% of finely divided silica and 0.3 vol.% of octyl trimellitate. The porous film had a void space rate of 49% and a thickness of 0.085 mm, showing a breaking strength of 62 kg/cm², a breaking elongation of 201%, a folding endurance of more than 10,000 runs, an electrical resistance of 0.00033 Ωdm²/sheet and good wettability in water.

EXAMPLE 3

The procedures of Example 1 were repeated except that 13.6 vol.% of finely divided silica [Nipsil VN-3(trade name): specific surface area—280 m²/g and average diameter of particles—16 mμ], 60.8 vol.% of DOP and 25.6 vol.% of polyethylene [Suntec S-

360(trade name): $\overline{M}_w=85,000$, $\overline{M}_n=21,000$ and SMLI=1]were used. The obtained porous film showed an excellent breaking strength, elongation and film characters as shown in Table 1. The porous film from which the silica was extracted had 4 to $6\times10^8/cm^2$ openings of average diameter of $0.14\mu$ on the surface of the film. The scanning electron microphotograph of the openings on the film surface is shown in FIG. 2.

EXAMPLE 4

The procedures of Example 3 were repeated except that a mixture of polyethylene (SLMI=0.1) consisting of 7 parts by weight of one class of polyethylene ($\overline{M}_w=180,000$, $\overline{M}_n=17,000$ and SLMI=0.04) and 3 parts by weight of another class of polyethylene ($\overline{M}_w=85,000$, $\overline{M}_n=21,000$ and SLMI=1) was used. The film obtained had a strength higher than that of Example 3 and excellent properties as shown in Table 1.

EXAMPLE 5

The procedures of Example 1 were repeated except that an ethylene-propylene copolymer (ethylene:-propylene=99.1:0.9 by weight) was used. The film obtained had an excellent mechanical strength and good film properties as shown in Table 1.

Examples 6, 7 and 8 are also summarized in Table 1 and the films obtained had excellent mechanical strengths and good film properties.

COMPARATIVE EXAMPLE 1

The procedures of Example 1 were repeated except that a polyethylene ($\overline{M}_w=120,000$, $\overline{M}_n=11,000$ and SLMI=0.3) was used. The porous film obtained was composed of 61.4 vol.% of polyethylene and 38.5 vol.% of finely divided silica, and had a void space rate of 56% and a thickness of 0.28 mm. The porous film had a breaking strength of 21 kg/cm², a breaking elongation of 11% and a folding endurance of 2 runs. Thus, the film was brittle and poor in flexibility. The electrical resistance of the film was 0.00042 $\Omega$dm²/sheet.

COMPARATIVE EXAMPLE 2

The procedures of Example 1 were repeated except that a polyethylene [Suntec F-160(trade name): $\overline{M}_w=83,000$, $\overline{M}_n=7,500$ and SLMI=0.9] was used. The obtained film was extremely brittle. The breaking elongation was 7% and the folding endurance are null. The film properties are shown in Table 1.

COMPARATIVE EXAMPLE 3

Comparative Example 3 is summarized in Table 1.

COMPARATIVE EXAMPLE 4

The procedures of Example 3 were repeated except that a polyethylene ($\overline{M}_w=330,000$, $\overline{M}_n=20,000$ and SLMI=0) was used. The porous film obtained had a breaking strength of 48 kg/cm² and a breaking elongation of 242%, which were higher than those of Comparative Example 3. The film of Comparative Example 4 had a void space rate as slow as 52%, and an electrical resistance as high as 0.00033 $\Omega$dm²/0.1 mm and 0.00083 $\Omega$dm²/sheet.

COMPARATIVE EXAMPLE 5

Procedures of Example 3 were repeated except that polyethylene ($\overline{M}_w=600,000$ and SLMI=0) was used. The porous film prepared was as thick as 0.3 mm because of difficulty in molding resulting from the high moleculer weight of the resin employed. The breaking strength and the breaking elongation were as large as 63 kg/cm² and 195%, respectively, but the porous film of this Comparative Example had a lower void space rate of 51% and a higher electrical resistance of 0.00040 $\Omega$dm²/0.1 mm and 0.0012 $\Omega$dm²/sheet. The porous film with the silica extracted had $0.03\mu$ average diameter of voids or openings on the surface of the polyethylene web structure, which was by far smaller than the $0.14\mu$ average diameter of the opening of Example 3. The opening area is also reduced. A scanning electron microphotograph of the surface opening is shown in FIG. 3.

COMPARATIVE EXAMPLE 6

The procedures of Example 1 were repeated except that a 15 vol.% of polyethylene ($\overline{M}_w=330,000$ and $\overline{M}_n=20,000$), 15 vol% of finely divided silica [Nipsil VN-3(trade name)] and a 70 vol.% of process oil (SP=7.9) were used. Petroleum ether was used for an extraction of the process oil. The obtained porous film showed slightly lower values in strength and elongation than that of Comparative Example 4. For all the amounts of the process oil employed, the obtained porous film had a slightly lowered void space rate of 56% and higher electrical resistance.

COMPARATIVE EXAMPLE 7

The procedures in Comparative Example 6 were repeated except that polyethylene ($\overline{M}_w=600,000$) was used. The porous film prepared had a higher tensile strength, a lower void space rate of 52% and a higher electrical resistance. The openings on the film surface were extremely fine as shown in FIG. 4 and could not be observed by a scanning electron microscope.

EXAMPLE 9

The procedures of Example 3 were repeated except that dibutyl phthalate (DBP: SP=9.4) was used in place of DOP. The porous film prepared had openings with an average diameter of $0.3\mu$, by far larger than that of Example 3, but good in other properties.

EXAMPLES 10 to 16

The procedures of Example 3 were repeated except that organic liquids having different SP values were used in place of DOP. The properties of the film obtained are shown in Table 2. As the Sp value of the liquid decreased towards 7.9 of polyethylene SP value, the mechanical strength of the film was increased but the other film properties were degraded.

COMPARATIVE EXAMPLE 8

The procedures of Example 3 were repeated except that dimethyl phthalate (DMP: SP=10.5) was used as organic liquid in place of DOP. The porous film prepared had openings of an extremely large average diameter of (0.62) with $\mu$ with a distructed web structure. The film was brittle because it had a breaking strength of 17.3 kg/cm² and a breaking elongation of 40%. See Table 2.

COMPARATIVE EXAMPLE 9

(corresponding to Example 6)

The procedures of Example 3 were repeated except that a process oil (SP=7.8) was used in place of DOP. Petroleum ether was used to extract the process oil.

5.6% of process oil remained in the film as unextracted oil. The film produced had an improved strength and elongation, but the void space rate was decreased to 50% and the electrical resistance was increased to 0.00074 $\Omega dm^2/0.1$ mm. The diameters of the openings on the surface of the film were so small that they could not be measured by an electron microscope. See Table 2.

TABLE 1

| | Polyolefin resin | | | | Filler $m^2/g$ | | Organic liquid | | |
|---|---|---|---|---|---|---|---|---|---|
| | Kind | MI | Molecular weight | Vol. % | Specific surface | Vol. % | Kind | SP | Vol. % |
| Example 1 | PE Suntec S-360 | 1 | $\overline{M}_w = 85,000$ $\overline{M}_n = 21,000$ | 24.0 | 175 | 15.0 | DOP | 8.9 | 61.0 |
| Example 2 | PE Suntec S-360 | 1 | $\overline{M}_w = 85,000$ $\overline{M}_n = 21,000$ | 34.0 | 175 | 13.0 | TOTM | 8.9 | 53.0 |
| Example 3 | PE Suntec-S-360 | 1 | $\overline{M}_w = 85,000$ $\overline{M}_n = 21,000$ | 25.6 | 280 | 13.6 | DOP | 8.9 | 60.8 |
| Example 4 | Blend of Suntec B-180 and Suntec S-360 | 0.1 | $\overline{M}_w = 180,000$ $\overline{M}_n = 17,000$ $\overline{M}_w = 85,000$ $\overline{M}_n = 21,000$ | 25.6 | 280 | 13.6 | DOP | 8.9 | 60.8 |
| Example 5 | Copolymer of E-P | 0.8 | $\overline{M}_w = 110,000$ $\overline{M}_n = 18,000$ | 24.0 | 175 | 15.0 | DOP | 8.9 | 61.0 |
| Example 6 | PE Suntec B-180 | 0.04 | $\overline{M}_w = 180,000$ $\overline{M}_n = 17,000$ | 25.6 | 280 | 13.6 | DOP | 8.9 | 60.8 |
| Example 7 | PE Suntec S-360 | 1 | $\overline{M}_w = 85,000$ $\overline{M}_n = 21,000$ | 20.0 | 380 | 14.0 | DOP | 8.9 | 66.0 |
| Example 8 | PE | 0.03 | $\overline{M}_w = 250,000$ $\overline{M}_n = 18,000$ | 25.6 | 280 | 13.6 | DOP | 8.9 | 60.8 |
| Comparative Example 1 | PE Suntec B-170 | 0.3 | $\overline{M}_w = 120,000$ $\overline{M}_n = 11,000$ | 24.0 | 175 | 15.0 | DOP | 8.9 | 61.0 |
| Comparative Example 2 | PE Suntec F-160 | 0.9 | $\overline{M}_w = 83,000$ $\overline{M}_n = 7,500$ | 24.0 | 175 | 15.0 | DOP | 8.9 | 61.0 |
| Comparative Example 3 | PE | 0.04 | $\overline{M}_w = 160,000$ $\overline{M}_n = 9,000$ | 24.0 | 175 | 15.0 | DOP | 8.9 | 61.0 |
| Comparative Example 4 | PE | 0 | $\overline{M}_w = 330,000$ | 25.6 | 280 | 13.6 | DOP | 8.9 | 60.8 |
| Comparative Example 5 | PE | 0 | $\overline{M}_w = 20,000$ $\overline{M}_w = 600,000$ | 25.6 | 280 | 13.6 | DOP | 8.9 | 60.8 |
| Comparative Example 6 | PE | 0 | $\overline{M}_w = 330,000$ $\overline{M}_n = 20,000$ | 15.0 | 280 | 15.0 | Process oil | 7.9 | 70.0 |
| Comparative Example 7 | PE | 0 | $\overline{M}_w = 600,000$ | 15.0 | 280 | 15.0 | Process oil | 7.9 | 70.0 |

| | Composition of film Resin/Filler/Liquid | | | Void space rate % | Average void diameter μ | Average thickness mm | Mechanical property | | Electrical resistance | | Permeability sec/100ml 0.1mm | Folding endurance run |
|---|---|---|---|---|---|---|---|---|---|---|---|---|
| | vol. % | vol. % | vol. % | | | | Breaking strength kg/cm² | Breaking elongation % | $10^{-5}\Omega dm^2/$ sheet | $10^{-5}\Omega dm^2/$ 0.1mm | | |
| Example 1 | 61.5 | 38.3 | 0.2 | 58 | 0.10 | 0.13 | 29 | 106 | 22 | 16 | 780 | 2400 |
| Example 2 | 72.2 | 27.5 | 0.3 | 49 | 0.09 | 0.08 | 62 | 201 | 33 | 39 | 530 | >10000 |
| Example 3 | 64.8 | 34.4 | 0.8 | 56 | 0.14 | 0.20 | 28 | 320 | 42 | 21 | 660 | 2100 |
| Example 4 | 65.1 | 34.5 | 0.4 | 54 | 0.10 | 0.18 | 32 | 280 | 41 | 22 | 720 | 2600 |
| Example 5 | 61.4 | 38.3 | 0.3 | 56 | 0.12 | 0.17 | 28 | 166 | 33 | 19 | 680 | 1800 |
| Example 6 | 65.0 | 34.5 | 0.5 | 54 | 0.08 | 0.22 | 38 | 314 | 49 | 22 | 770 | 3200 |
| Example 7 | 59.0 | 40.9 | 0.1 | 66 | 0.11 | 0.27 | 22 | 129 | 28 | 10 | 420 | 1100 |
| Example 8 | 65.0 | 34.5 | 0.5 | 53 | 0.07 | 0.22 | 41 | 295 | 55 | 25 | 810 | 2900 |
| Comparative Example 1 | 61.4 | 38.5 | 0.1 | 56 | 0.11 | 0.28 | 21 | 11 | 42 | 15 | 690 | 2 |
| Comparative Example 2 | 61.5 | 38.3 | 0.2 | 59 | 0.15 | 0.21 | 20 | 7 | 34 | 16 | 580 | 0 |
| Comparative Example 3 | 61.3 | 38.5 | 0.2 | 58 | 0.08 | 0.24 | 24 | 22 | 35 | 14 | 800 | 29 |
| Comparative Example 4 | 64.8 | 34.4 | 0.8 | 52 | 0.05 | 0.25 | 48 | 242 | 83 | 33 | 920 | 3800 |
| Comparative Example 5 | 65.0 | 34.5 | 0.5 | 51 | 0.03 | 0.30 | 63 | 195 | 120 | 40 | 1100 | 5300 |
| Comparative Example 6 | 45.0 | 45.0 | 10.0 | 56 | —* | 0.22 | 20 | 52 | 70 | 32 | 1780 | 700 |
| Comparative Example 7 | 44.8 | 44.8 | 10.4 | 52 | —* | 0.28 | 34 | 233 | 106 | 38 | 1910 | 1400 |

Note:
PE-polyethylene
E-ethylene
P-propylene
Filler-finely divided silica
*The void formed is too fine to be measured

TABLE 2

| | SP | Organic liquid | Void space rate % | Electrical resistance Ωdm²/0.1mm | Permeability sec/100ml 0.1mm | Breaking strength Kg/c-mhu 2 | Breaking elongation % | Average void diameter μ |
|---|---|---|---|---|---|---|---|---|
| Example 9 | 9.4 | DBP | 62 | 22 | 486 | 27.0 | 240 | 0.30 |
| Example 10 | 9.9 | TCP | 61 | 21 | 416 | 21.0 | 64 | 0.46 |
| Example 11 | 9.9 | DEP | 62 | 23 | 477 | 20.7 | 93 | 0.43 |
| Example 12 | 9.3 | Octyl diphenyl phosphate | 61 | 24 | 560 | 28.2 | 247 | 0.26 |
| Example 13 | 9.0 | DBM | 55 | 25 | 700 | 29.1 | 284 | 0.17 |
| Example 14 | 8.9 | DOP | 55 | 22 | 660 | 28.0 | 318 | 0.12 |
| Example 15 | 8.6 | TBP | 57 | 28 | 582 | 26.0 | 231 | 0.09 |
| Example 16 | 8.4 | DOS | 54 | 44 | 1397 | 23.0 | 272 | 0.06 |
| Comparative Example 8 | 10.5 | DMP | 63 | 17 | 324 | 17.3 | 40 | 0.62 |
| Comparative Example 9 | 7.8 | Process oil | 50 | 74 | 1812 | 36.5 | 151 | —* |

Note:
Composition of porous film-polyethylene:Silica:Organic liquid = 25.6:13.6:60.8 (vol. %)
*The void formed is too fine to be measured by an electron microscope.

What is claimed is:

1. A microporous film having improved mechanical strength and electrical resistance which comprises 50 to 80% volume percent of a polyolefin having a number average molecular weight of 15,000 or more, a weight average molecular weight of 85,000 to 250,000 and a standard load melt index of at least 0.01, and 20 to 50 volume percent of an inorganic filler; and which has a void space rate of 30 to 75 volume percent based on the volume of the film.

2. A microporous film as set forth in claim 1, wherein said polyolefin has a number average molecular weight of 17,000 to 50,000.

3. A microporous film as set forth in claim 1, wherein said standard load melt index is in the range of 0.03 to 1.

4. A microporous film as set forth in claim 1, which has a thickness ranging from 0.05 to 1 mm.

5. A microporous film as set forth in claim 4, wherein the film thickness is in the range of 0.10 to 0.30 mm.

6. A microporous film as set forth in claim 1, wherein said polyolefin is an olefin homopolymer.

7. A microporous film as set forth in claim 6, wherein said polyolefin is polyethylene.

8. A microporous film as set forth in claim 1, wherein said polyolefin is an olefin copolymer.

9. A microporous film as set forth in claim 8, wherein said polyolefin is an ethylene copolymer.

10. A microporous film as set forth in claim 9, wherein said ethylene copolymer is an ethylene-propylene copolymer, an ethylene-butene copolymer or an ethylene-propylene-butene terpolymer.

11. A microporous film as set forth in claim 1, wherein said polyolefin is a copolymer of ethylene as a main component with other olefin.

12. A microporous film as set forth in claim 1, wherein said polyolefin has a web structure defining a network void in which said inorganic filler is attachedly contained, leaving a space to form a path communication from one surface of the film to the opposite surface thereof.

13. A microporous film as set forth in claim 12, wherein said void has an average void diameter ranging from 0.05 to 0.5μ.

14. A microporous film as set forth in claim 12, wherein said average void diameter is in the range of 0.08 to 0.3μ.

15. A battery separator made of a microporous film as set forth in claim 1.

16. A battery separator as set forth in claim 15, having a thickness of 0.05 to 1 mm and an electrical resistance of 0.0006Ωdm²/sheet or less.

17. A microporous film as set forth in claim 1, wherein said inorganic filler has an average particle diameter of 0.005 to 0.5μ.

18. A microporous film as set forth in claim 1, wherein said inorganic filler has a specific surface area of 50 to 500 m²/g.

19. A microporous film as set forth in claim 18, wherein said inorganic filler has a specific surface area of 150 400 m²g.

20. A microporous film as set forth in claim 1, wherein said inorganic filler is hydrophilic.

21. A microporous film as set forth in claim 1, wherein said void space rate is 45 to 65 volume percent based on the volume of the film.

22. A method for preparing a microporous film which comprises: blending a polyolefin having a number average molecular weight of 15,000 or more, a weight average molecular weight of 85,000 to 250,000, and a standard load melt index of at least 0.01; an inorganic filler and an organic liquid having a solubility parameter ranging from 8.4 to 9.9 in amounts of 10 to 60 volume percent, 6 to 35 volume percent and 30 to 75 volume percent, respectively, based on the whole volume of the polyolefin-filler-liquid composition, the amount of the polyolefin being ⅔ to 9 multiple of the amount of the inorganic filler; subjecting the resulting blend to molding to form a film; and extracting from said film the organic liquid.

23. A method as set forth in claim 22, wherein said polyolefin has a number average molecular weight of 17,000 to 50,000.

24. A method as set forth in claim 22, wherein said standard load melt index is in the range of 0.03 to 1.

25. A method for preparing a microporous film as set forth in claim 22, wherein said solubility parameter is in the range of 8.6 to 9.4.

26. A method for preparing a mecroporous film as set forth in claim 22, wherein said organic liquid is dioctyl phthalate or trioctyl trimellitate.

27. A method as set forth in claim 22, wherein said molding is effected using an extrusion molding method employing a T-die.

28. A method as set forth in claim 22, wherein said inorganic filler has an average particle diameter of 0.005 to 0.5μ.

29. A method as set forth in claim 22, wherein said inorganic filler has a specific surface area of 50 to 500 m$^2$/g.

* * * * *